US008667740B1

(12) United States Patent
Hashimoto et al.

(10) Patent No.: US 8,667,740 B1
(45) Date of Patent: Mar. 11, 2014

(54) WEATHER STRIP

(71) Applicant: Nishikawa Rubber Co., Ltd., Hiroshima (JP)

(72) Inventors: Yutaka Hashimoto, Hiroshima (JP); Akio Okayama, Hiroshima (JP); Ayako Teishi, Hiroshima (JP)

(73) Assignee: Nishikawa Rubber Co., Ltd., Hiroshima-Shi (JP)

( * ) Notice: Subject to any disclaimer, the term of this patent is extended or adjusted under 35 U.S.C. 154(b) by 0 days.

(21) Appl. No.: 13/845,381

(22) Filed: Mar. 18, 2013

(51) Int. Cl.
*E06B 7/22* (2006.01)

(52) U.S. Cl.
USPC .................................. 49/498.1; 49/490.1

(58) Field of Classification Search
USPC .................... 49/475.1, 490.1, 498.1
See application file for complete search history.

(56) References Cited

U.S. PATENT DOCUMENTS

| 4,474,402 | A  | * | 10/1984 | Shelton | 296/76 |
| 4,769,950 | A  | * | 9/1988 | Ogawa et al. | 49/490.1 |
| 4,819,382 | A  | * | 4/1989 | Suzuki et al. | 49/490.1 |
| 6,972,140 | B2 | * | 12/2005 | Watanabe | 428/36.9 |
| 7,685,777 | B2 | * | 3/2010 | Nozaki et al. | 49/498.1 |
| 8,091,956 | B2 | * | 1/2012 | Oerke et al. | 296/216.06 |
| 2005/0022454 | A1 | * | 2/2005 | Aida et al. | 49/490.1 |
| 2008/0000165 | A1 | * | 1/2008 | Ochiai | 49/490.1 |
| 2008/0148646 | A1 | * | 6/2008 | Nozaki et al. | 49/490.1 |

FOREIGN PATENT DOCUMENTS

| JP | 2004/098889 A | 4/2004 |
| JP | 2004/189212 A | 7/2004 |
| JP | 2008/174196 A | 7/2008 |
| JP | 2008-174196 A | 7/2008 |
| JP | 2010-030445 A | 2/2010 |

OTHER PUBLICATIONS

Extended European Search Report mailed Jul. 30, 2013, which was issued in a related European Application No. 13161546.0 (6 pages).

\* cited by examiner

*Primary Examiner* — Jerry Redman
(74) *Attorney, Agent, or Firm* — Robert P. Michal; Lucas & Mercanti, LLP

(57) ABSTRACT

A weather strip mounted along a circumferential edge of a door opening of an automobile body comprises: an installation base member having a substantially U-shape in cross-section; and a hollow seal member provided on an outer-cabin side of the installation base member, which makes elastic contact with a protrudingly curved surface having a substantially U-shape in cross-section of the door; in which the hollow seal member includes: a first hollow wall having a substantially reversed V-shape in cross-section and a second hollow wall having a substantially V-shape in cross-section, which are connected with each other; a seal wall swelled and curved toward an inner side of the hollow seal member; and a protrusion protrudingly provided toward the outer-cabin side in succession to the seal wall, which makes elastic contact with the protrudingly curved surface.

16 Claims, 4 Drawing Sheets

WEATHER STRIP

This application is related to JP Patent Application JP 2011-234535 filed Oct. 26, 2011, the entire disclosure of which is incorporated herein by reference.

BACKGROUND OF THE INVENTION

The present invention relates to weather strips mounted along door openings of automobile bodies, which make elastic contact with doors when the doors are closed to seal inside and outside of the automobiles.

As shown in FIG. 5, weather strips 1 are mounted along door 70 openings on body 60 sides of the automobiles, which make elastic contact with the doors 70 when the doors 70 are closed to seal inside and outside of the automobiles.

The weather strips 1 often make elastic contact with planes on the door 70 sides. But some weather strips 1 make elastic contact with protrudingly curved surfaces 70a having substantially U-shapes in cross-section, which is protrudingly provided toward an inside from the doors 70 (inner-cabin side when the doors 70 are closed) as shown in FIG. 6 in consideration of design of the automobiles or precision in fitting.

Such weather strips 1 comprise: an installation base member 10 having substantially U-shapes in cross-section in which a flange 140 formed along the door 70 opening is inserted, including an outer-cabin side wall 11, an inner-cabin side wall 12 and a bottom wall 13 which connects the side walls 11, 12; and a hollow seal member 20 integrally molded with the outer-cabin side wall 11 of the installation base member 10, which makes elastic contact with the protrudingly curved surface 70a of the door 70 when the door 70 is closed.

The hollow seal member 20 has a shape of pantograph including a first hollow wall 21 and second hollow wall 22 connected with each other. The first hollow wall 21 is bent around a first bent point 91 to have a substantially reversed V-shape in cross-section and the second hollow wall 22 is bent around a second bent point 92 to have a substantially V-shape in cross-section (see, for example, the Japanese unexamined Patent Publication Nos. 2008-174196 and 2010-030445).

The outer-cabin side wall 11 of the installation base member 10 has convexes 15 provided inside (inner-cabin side), which are slidably brought into contact with an outer-cabin side surface of the flange 140 as the flange 140 is inserted. The inner-cabin side wall 12 has a lip 16 having a substantially tongue shape in cross-section formed inside (outer-cabin side), which is slidably brought into contact with an inner-cabin side surface of the flange 140 as the flange 140 is inserted. Also, a decorative lip 17 is formed on a connecting position of the inner-cabin side wall 12 and the bottom wall 13, which extends toward an inner-cabin side and has a substantially tongue shape in cross-section. The installation base member 10 has a core 18 buried therein, which has a substantially U-shape in cross-section.

The weather strips 1 of FIG. 6 and the weather strips of the Japanese unexamined Patent Publication Nos. 2008-174196 and 2010-030445 do not cause problems when making elastic contact with the planes on the door 70 sides because the second hollow wall 22 of the hollow seal member 20 as a seal wall side which makes elastic contact with the door 70 is swelled and curved toward the outer-cabin side. But, when making elastic contact with the protrudingly curved surface 70a having substantially U-shapes in cross-section which is protrudingly provided toward the inside from the doors 70, the weather strips have caused problems that a top end 22a side of the second hollow wall 22 curves in a manner to approach an inner-cabin side, thereby generating a triangular aperture 110 between the top end 22a of the second hollow wall 22 and the protrudingly curved surface 70a and, as a result, drops of water which collect in the triangular aperture 110 fall inside the cabin when the door 70 is opened.

Also, elastic contact between the hollow seal member 20 and the protrudingly curved surface 70a of the door 70, not the planes, requires high precision in an elastic contact position. Accordingly, even slight swerve in the elastic contact position caused by unevenness in fitting sharply decreases surface pressure (reaction force), degrades sealing property and causes water leak or enlarges triangular aperture 110.

Therefore, an object of the present invention is to provide weather strips which perform sufficient sealing function when making elastic contact with protrudingly curved surfaces of the doors.

SUMMARY OF THE INVENTION

In order to achieve the above-mentioned object, according to one aspect of the invention, a weather strip (100) is provided, which is mounted along a circumferential edge of a door (70) opening of an automobile body (60), the weather strip comprising: an installation base member (30) having a substantially U-shape in cross-section, including an outer-cabin side wall (31), an inner-cabin side wall (32) and a bottom wall (33) which connects the side walls (31, 32); and a hollow seal member (40) provided on an outer-cabin side of the installation base member (30), said hollow seal member (40) making elastic contact with a protrudingly curved surface (70a) having a substantially U-shape in cross-section, which is protrudingly provided toward an inner-cabin side from the door (70); wherein:

said hollow seal member (40) includes a first hollow wall (41) and a second hollow wall (42) which are connected with each other, said first hollow wall (41) being bent into a substantially reversed V-shape in cross-section around a first bent point (81) and said second hollow wall (42) being bent into a substantially V-shape in cross-section around a second bent point (82);

one end (41a) of said first hollow wall (41) is connected around an end part of the outer-cabin side wall (31) of said installation base member (30) and one end (42a) of said second hollow wall (42) is connected to a part determined by protruding toward an outer-cabin side from a part on the bottom wall (33) side of the outer-cabin side wall (31) of said installation base member (30), descending substantially in parallel with the outer-cabin side wall (31) and further protruding toward said bottom wall (33) side;

an interval between one end (42a) of said second hollow wall (42) and the second bent point (82) is a vertical wall (42X) vertically formed toward the outer-cabin side and an interval between said second bent point (82) and another end (42b) of the second hollow wall (42) is a seal wall (42Y) swelled and curved toward an inner side of said hollow seal member (40), said seal wall (42Y) making elastic contact with the protrudingly curved surface (70a) of said door (70);

the other end (42b) of said second hollow wall (42) has a protrusion (43) provided in succession to said seal wall (42Y), said protrusion (43) making elastic contact with the protrudingly curved surface (70a) of said door (70) together with the seal wall (42Y); and another end (41b) of said first hollow wall (41) is connected with the inner side of said hollow seal member (40), which is on the other end (42b) of said second hollow wall (42) while the protrusion (43) protrudes toward the outer-cabin side.

In addition, according to an aspect of the invention, a weather strip (100) is provided, wherein: curvature radius (120) of the seal wall (42Y) of said second hollow wall (42) is larger than curvature radius (130) of the protrudingly curved surface (70a) protrudingly provided from said door (70).

In addition, according to an aspect of the invention, a weather strip (100) is provided, wherein; an interval between the second bent point (82) of said second hollow wall (42) and the other end (42b) of said second hollow wall (42) is formed at an obtuse angle (θ) relative to said vertical wall (42X).

In addition, according to an aspect of the invention, a weather strip (100) is provided, wherein: a part of an interval between the one end (41a) of said first hollow wall (41) and said first bent point (81) is made of material which increases rigidity compared with at least one other part of the first hollow wall (41) or is made to be thicker compared with at least one other part of the first hollow wall (41) for increasing rigidity.

In addition, according to an aspect of the invention, a weather strip (100) is provided, wherein: a part of the interval between the one end (42a) of said second hollow wall (42) and the second bent point (82) is made of material which increases rigidity compared with at least one other part of the second hollow wall (42) or is made to be thicker compared with at least one other part of the second hollow wall (42) for increasing rigidity.

In addition, according to an aspect of the invention, a weather strip (100) is provided, which is mounted along a circumferential edge of a door (70) opening of an automobile body (60), the weather strip comprising: an installation base member (30) having a substantially U-shape in cross-section, including an outer-cabin side wall (31), an inner-cabin side wall (32) and a bottom wall (33) which connects the side walls (31, 32); and a hollow seal member (40) provided on an outer-cabin side of the installation base member (30), said hollow seal member (40) making elastic contact with a protrudingly curved surface (70a) having a substantially U-shape in cross-section, which is protrudingly provided toward an inner-cabin side from the door (70); wherein:

said hollow seal member (40) includes: a seal wall (42Y) which makes elastic contact with a protrudingly curved surface (70a) of said door (70), of which curvature radius (120) is larger than curvature radius (130) of said protrudingly curved surface (70a) and which is swelled and curved toward an inner side of the hollow seal member (40); and a protrusion (43) which protrudes toward the outer-cabin side in succession to said seal wall (42Y) and makes elastic contact with said protrudingly curved surface (70a) together with said seal wall (42Y).

Symbols in parentheses show constituents or items corresponding to the drawings.

According to the weather strip of the present invention, the hollow seal member which makes elastic contact with the protrudingly curved surface, which is protrudingly provided toward the inner-cabin side from the door and having a substantially U-shape in cross-section, includes the first hollow wall and the second hollow wall. The first hollow wall is bent into the substantially reversed V-shape in cross-section around the first bent point and the second hollow wall is bent into the substantially V-shape in cross-section around the second bent point. The second hollow wall includes the seal wall which is swelled and curved toward the inner side of the hollow seal member and which makes elastic contact with the protrudingly curved surface of the door. The seal wall has the protrusion formed on a top end thereof. The protrusion is formed in succession to the seal wall in a manner to protrude toward the outer-cabin side and makes elastic contact with the protrudingly curved surface of the door together with the seal wall.

More specifically, the seal wall and the protrusion which protrudes from the seal wall are warped relative to the outer-cabin side. Accordingly, when the seal wall makes elastic contact with the protrudingly curved surface of the door when the door is closed, the protrusion approaches and adheres to the protrudingly curved surface of the door, thereby preventing a triangular aperture according to the prior art between the protrusion and the protrudingly curved surface of the door.

As a result, entrance of drops of water into a cabin side from the outer-cabin side of the protrusion is prevented when the door is opened.

In addition, since the seal wall is swelled and curved toward the inner side of the hollow seal member, the seal wall can easily follow the protrudingly curved surface of the door. Especially, when the curvature radius of the seal wall is larger than the curvature radius of the protrudingly curved surface, a stable sealing function is achieved and the weather strip can deal with unevenness in fitting to some extent. As a result, a sharp decrease in surface pressure (reaction force) according to the prior art is prevented.

In addition, the one end of the second hollow wall forming the hollow seal member is connected to the part determined by protruding toward the outer-cabin side from the part on the bottom wall side of the outer-cabin side wall of the installation base member, descending substantially in parallel with the outer-cabin side wall and further protruding toward the bottom wall side, not directly to the part on the bottom wall side of the outer-cabin side wall of the installation base member. Also, the vertical wall is vertically formed toward the outer-cabin side from a connecting position of the one end of the second hollow wall, of which top end is the second bent point. Accordingly, the second bent point is on a door side position and the first bent point of the first hollow wall is on a door side position compared with the outer-cabin side wall of the installation base member.

Since the first and second bent points are formed on the door side positions of the hollow seal member, the seal wall and the protrusion as parts on the outer-cabin side of the second hollow wall side compared with the second bent point as well as a part on the outer-cabin side of the first hollow wall side compared with the first bent point are fixed in bending direction and secure stable sealing property while making elastic contact with the protrudingly curved surface of the door, and can deal with unevenness in fitting to some extent.

In addition, according to the present invention, since the interval between the second bent point and the other end of said second hollow wall is formed at an obtuse angle relative to said vertical wall, the hollow part can be enlarged compared with a case of an acute angle, thereby increasing reaction force by the elastic contact.

In addition, according to the present invention, since a part of an interval between the one end of the first hollow wall and the first bent point is made of material which increases rigidity compared with at least one other part of the first hollow wall or is made to be thicker compared with at least one other part of the first hollow wall for increasing rigidity, rigidity of a base side of the hollow seal member is secured, thereby further stabilizing sealing property.

In addition, according to the present invention, since a part of the interval between the one end of the second hollow wall and the second bent point is made of material which increases rigidity compared with at least one other part of the second hollow wall or is made to be thicker compared with at least one other part of the second hollow wall for increasing rigidity, in the same manner as mentioned above, rigidity of the base side of the hollow seal member is secured, thereby further stabilizing sealing property.

Examples of shape of the hollow seal member vary. But a hollow seal member including: the seal wall which makes elastic contact with the protrudingly curved surface of the door, of which curvature radius is larger than the curvature radius of the protrudingly curved surface and which is swelled and curved toward the inner side of the hollow seal member; and the protrusion such as a projection or a lip which protrudes toward the outer-cabin side in succession to the seal wall and makes elastic contact with the protrudingly curved surface of the door together with said seal wall; provides the weather strip which prevents generation of the triangular aperture between the protrusion and the protrudingly curved surface of the door and can deal with unevenness in fitting to some extent.

DESCRIPTION OF PREFERRED EMBODIMENT

Figure 1:
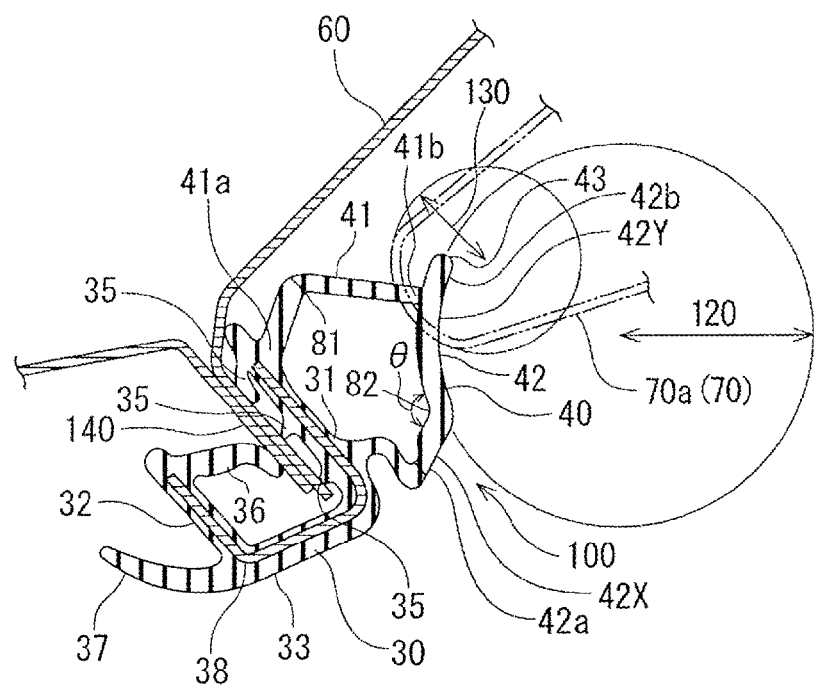
FIG. 1 is a I-I line enlarged cross section of FIG. 5, showing a weather strip according to an embodiment of the present invention.
Figure 2:
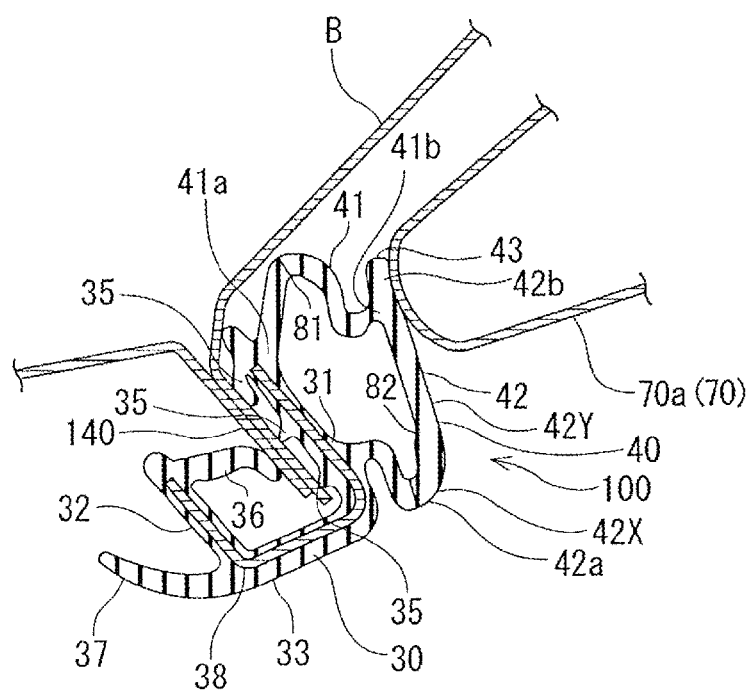
FIG. 2 is a cross section showing a state that the weather strip of FIG. 1 makes elastic contact with a door.
Figure 3:
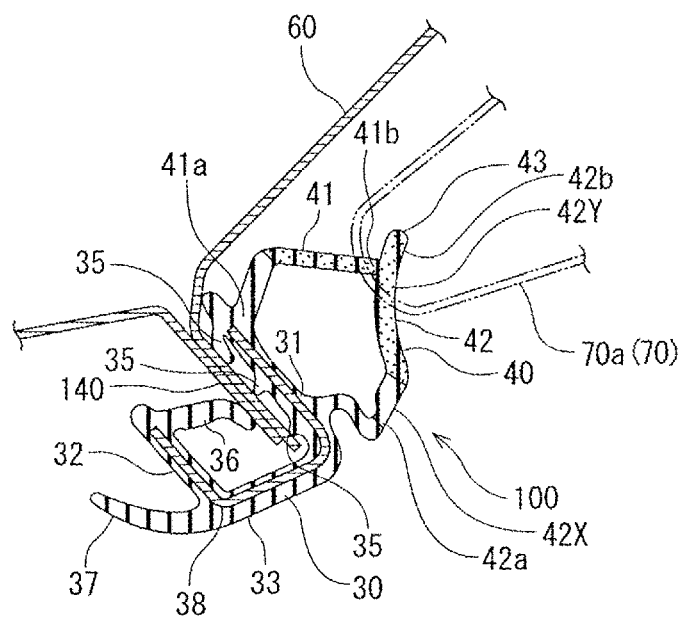
FIG. 3 is a I-I line enlarged cross section of FIG. 5, showing a weather strip according to another embodiment of the present invention.
Figure 5:
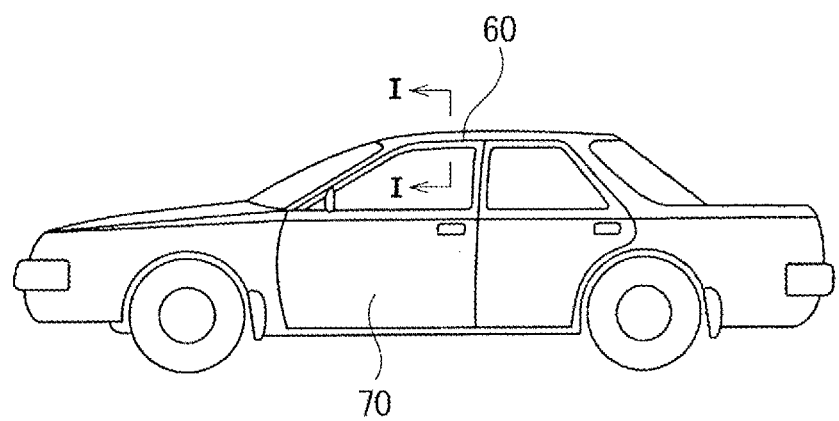
FIG. 5 is an external lateral view of an automobile.
Figure 6:
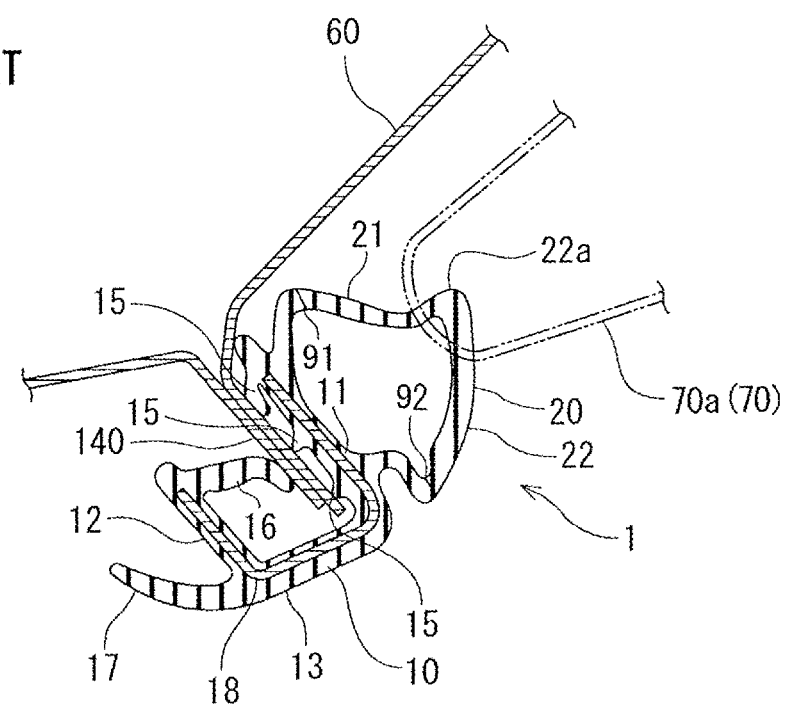
FIG. 6 is a I-I line enlarged cross section of FIG. 5, showing a weather strip according to a prior art.
Figure 7:
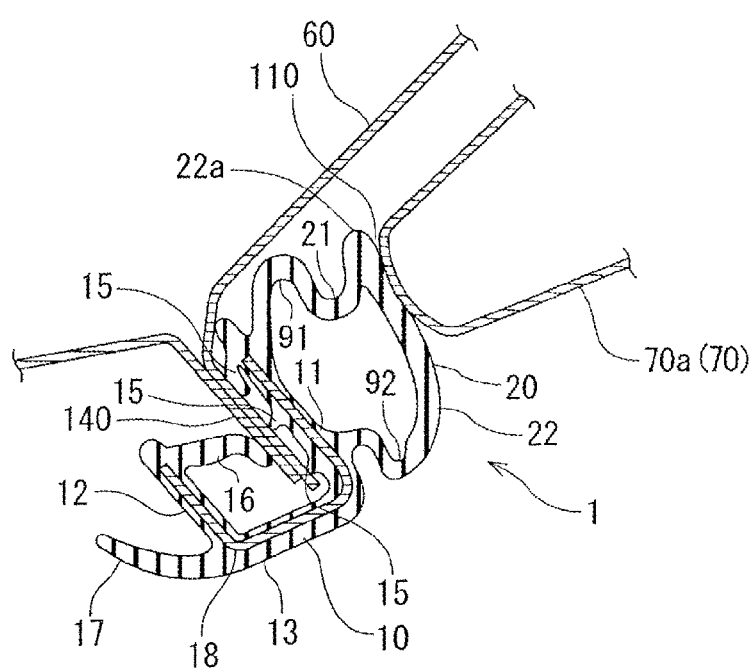
FIG. 7 is a cross section showing a state that the weather strip of FIG. 6 makes elastic contact with the door.

Referring to FIG. 1 and FIG. 2, a weather strip 100 according to an embodiment of the present invention will be described. FIG. 1 is a I-I line enlarged cross section of FIG. 5, showing a weather strip 100 according to an embodiment of the present invention. FIG. 2 is a cross section showing a state that the weather strip 100 according to the embodiment makes elastic contact with a door 70 and a hollow seal member 40 is bent. When constituents or items correspond to those in prior arts, the same symbols are used.

The weather strip 100 according to the embodiment of the present invention comprises: an installation base member 30 mounted by fitting on a flange 140 provided along a circumferential edge of a door 70 opening of an automobile body 60; and a hollow seal member 40 which is provided on an outer-cabin side wall 31 of the installation base member 30 and making elastic contact with a protrudingly curved surface 70a having a substantially U-shape in cross-section, which is protrudingly provided toward an inside (inner-cabin side when the door 70 is closed) from the door 70 when the door is closed.

The installation base member 30 has a substantially U-shape in cross-section, including an outer-cabin side wall 31, an inner-cabin side wall 32 and a bottom wall 33 which connects the side walls 31,32. Material of the installation base member 30 is not especially limited. Examples of the material include solid material of EPDM and sponge material of EPDM of which specific gravity is more than 0.4. The outer-cabin side wall 31 of the installation base member 30 has a plurality of convexes 35 (3 in the present embodiment) formed inside (inner-cabin side), which are slidably brought into contact with an outer-cabin side surface of the flange 140 as the installation base member 30 is fit on the flange 140. The inner-cabin side wall 32 has a lip 36 having a substantially tongue-shape in cross-section formed inside (outer-cabin side), which is slidably brought into contact with an inner-cabin side surface of the flange 140 as the installation base member 30 is fit on the flange 140. A decorative lip 37 is formed on a connecting position of the inner-cabin side wall 32 and the bottom wall 33, which extends toward the inner-cabin side. The installation base member 30 has a core 38 (made of metal or resin) having a substantially U-shape in cross-section embedded therein.

The hollow seal member 40 has a shape of pantograph including a first hollow wall 41 bent around a first bent point 81 to have a substantially reversed V-shape in cross-section and a second hollow wall 42 bent around a second bent point 82 to have a substantially V-shape in cross-section. The first hollow wall 41 and the second hollow wall 42 are connected with each other in a direction that the first bent point 81 and the second bent point 82 are spaced out from each other.

As to the first hollow wall 41, one end 41a of the first hollow wall 41 is connected around an end part of the outer-cabin side wall 31 of the installation base member 30, extends diagonally outside (in FIG. 1, diagonally upper left side relative to a line in which the flange 140 extends) and bends on the first bent point 81 while another end 41b of the first hollow wall 41 extends toward the outer-cabin side which is an inner side of the hollow seal member 40 and is connected to the inner side of the hollow seal member 40 which is on another end 42b of the second hollow wall 42.

An interval between the one end 41a of the first hollow wall 41 and the first bent point 81 is made to be thicker compared with at least one other part of the first hollow wall 41 for increasing rigidity. Also, the interval between the one end 41a of the first hollow wall 41 and the first bent point 81 can be partially made to be thicker, not the interval as a whole. In the present embodiment, an interval between the first bent point 81 and the other end 41b of the first hollow wall 41 is a little longer than the interval between the one end 41a of the first hollow wall 41 and the first bent point 81 in cross section. But the two intervals can be substantially of the same length or the interval between the one end 41a of the first hollow wall 41 and the first bent point 81 can be a little longer so that the first bent point 81 further approaches the door 70 side.

As to the second hollow wall 42, one end 42a of the second hollow wall 42 is connected to a part determined by protruding toward the outer-cabin side from a part on the bottom wall 33 side of the outer-cabin side wall 31 of the installation base member 30, descending substantially in parallel with the outer-cabin side wall 31 and further protruding toward the bottom wall 33 side. The second hollow wall 42 extends in a manner to stand diagonally outside (in FIG. 1, diagonally upper left side relative to the line in which the flange 140 extends) and bends on the second bent point 82 while the other end 42b of the second hollow wall 42 extends toward the outer-cabin side which is the inner side of the hollow seal member 40 in a manner to cover the one end 41a of the first hollow wall 41 from the outer-cabin side.

In the present embodiment, an interval between the one end 42a of the second hollow wall 42 and the second bent point 82 is a vertical wall 42X and an interval between the second bent point 82 of the second hollow wall 42 and the other end 42b of the second hollow wall 42 is a seal wall 42Y. A direction in which the seal wall 42Y extends is an obtuse angle θ relative to a direction in which the vertical wall 42X extends in cross section. The seal wall 42Y is swelled and curved toward an inner side of the hollow seal member 40.

The other end 42*b* of the second hollow wall 42, which is the top end of the seal wall 42Y has a lip 43 having a substantially tongue-shape in cross-section formed thereon in succession to the seal wall 42Y. As mentioned above, since the other end 41*b* of the first hollow wall 41 is connected with the inner side of the hollow seal member 40 which is on the other end 42*b* of the second hollow wall 42, the lip 43 protrudes toward the outer-cabin side over the hollow part.

In addition, curvature radius 120 of the seal wall 42Y is larger than curvature radius 130 of the protrudingly curved surface 70*a* protrudingly provided from the door 70 and the lip 43 is provided in succession to the seal wall 42Y so that the lip 43 is on the same locus as the curvature radius 120 of the seal wall 42Y. In other words, the seal wall 42Y and the lip 43 make elastic contact with the protrudingly curved surface 70*a* when the door 70 is closed while concavely warping toward the outer-cabin side that is the protrudingly curved surface 70*a* side of the door 70.

An interval between the one end 42*a* of the second hollow wall 42 and the second bent point 82 is made to be thicker compared with at least one other part of the second hollow wall 42 for increasing rigidity. Also, the interval between the one end 42*a* of the second hollow wall 42 can be partially made to be thicker, not the interval as a whole. In the present embodiment, an interval between the second bent point 82 and the other end 42*b* of the second hollow wall 42 is longer than the interval between the one end 42*a* of the second hollow wall 42 and the second bent point 82 in cross section. But the two intervals can be substantially of the same length or the interval between the one end 42*a* of the second hollow wall 42 and the second bent point 82 can be a little longer so that the second bent point 82 further approaches the door 70 side.

As mentioned above, the hollow seal member 40 includes: the first hollow wall 41 having the substantially reversed V-shape in cross-section, which is connected to the end part side of the outer-cabin side wall 31 of the installation base member 30; and the second hollow wall 42 having the substantially V-shape in cross-section, which is connected to the part determined by protruding toward the outer-cabin side from the part on the bottom wall 33 side of the outer-cabin side wall 31 of the installation base member 30, descending substantially in parallel with the outer-cabin side wall 31 and further protruding toward the bottom wall 33 side. Since the hollow seal member 40 is formed by connecting the first hollow wall 41 with the second hollow wall 42, the hollow part is substantially heptagonal. Material of the hollow seal member 40 is not especially limited. Examples of the material of the hollow seal member 42 include: material having an equivalent degree of rigidity to that of the installation base member 30; and sponge material or solid material of EPDM or the like, which are lower in rigidity than the material of the installation base member 30.

According to the above-structured weather strip 100, when the seal wall 42Y of the hollow seal member 40 makes elastic contact with the protrudingly curved surface 70*a* of the door 70 while the door is closed, the first hollow wall 41 having the substantially reversed V-shape in cross-section and the second hollow wall 42 having the substantially V-shape in cross-section bend in a manner that the first bent point 81 and the second bent point 82 are spaced out from each other and the V-shapes are squashed toward the inner-cabin side from the outer-cabin side, and the other end 41*b* side of the first hollow wall 41 curves in a manner to enter the inner side of the hollow seal member 40. In the state, since the seal wall 42Y and the lip 43 which extends from the seal wall 42Y warp toward the outer-cabin side, the lip 43 approaches the protrudingly curved surface 70*a* of the door 70 and a back side (outer-cabin side) of the lip 43 adheres to the protrudingly curved surface 70*a* as shown in FIG. 2.

Such a structure prevents generation of a triangular aperture 110 between the lip 43 and the protrudingly curved surface 70*a* of the door 70 as in the prior art and drops of water from falling inside the cabin from the outer-cabin side of the lip 43 when the door 70 is opened.

Since the seal wall 42Y is swelled and curved toward the inner side of the hollow seal member 40, the seal wall 42Y can easily follow the protrudingly curved surface 70*a* of the door 70. Especially, since the curvature radius 120 of the seal wall 42Y is larger than the curvature radius 130 of the protrudingly curved surface 70*a* of the door 70, a stable sealing function is achieved and the weather strip can deal with unevenness in fitting to some extent. As a result, a sharp decrease in surface pressure (reaction force) as in the prior art is prevented.

Since the first bent point 81 and the second bent point 82 of the first hollow wall 41 and the second hollow wall 42 forming the hollow seal member 40 are formed on the door 70 side (outer-cabin side) positions of the hollow seal member 40, the seal wall 42Y and the lip 43 as parts on the outer-cabin side of the second hollow wall 42 side compared with the second bent point 82 as well as a part on the outer-cabin side of the first hollow wall 41 side compared with the first bent point 81 are fixed in bending direction and secure stable sealing property while making elastic contact with the protrudingly curved surface 70*a* of the door 70, and can deal with unevenness in fitting to some extent.

In the present embodiment, the interval between the second bent point 82 and the other end 42*b* of the second hollow wall 42 is formed at an obtuse angle θ relative to the vertical wall 42X. Accordingly, the hollow part can be enlarged compared with a case of an acute angle, thereby increasing the reaction force by the elastic contact.

In addition, since a part of the interval between the one end 41*a* of the first hollow wall 41 and the first bent point 81 is made to be thicker compared with at least one other part of the first hollow wall 41 for increasing rigidity and a part of the interval between the one end 42*a* of the second hollow wall 42 and the second bent point 82 is made to be thicker compared with at least one other part of the second hollow wall 42 for increasing rigidity, rigidity of parts as base sides of the hollow seal member 40 is secured, thereby further stabilizing sealing property.

Instead of thickening a part of the interval between the one end 41*a* of the first hollow wall 41 and the first bent point 81 and a part of the interval between the one end 42*a* of the second hollow wall 42 and the second bent point 82, a part of the interval between the one end 41*a* of the first hollow wall 41 and the first bent point 81 may be made of material (the same material as that of the installation base member 30 for example, solid material in the present embodiment) which increases rigidity compared with at least one other part (sponge material in the present embodiment) of the first hollow wall 41 and a part of the interval between the one end 42*a* of the second hollow wall 42 and the second bent point 82 may be made of material (the same material as that of the installation base member 30 for example, solid material in the present embodiment) which increases rigidity compared with at least one other part (sponge material in the present embodiment) of the second hollow wall 42.

According to the weather strip 100 of the embodiment of the present invention, examples of shape of the hollow seal member 40 vary. But a hollow seal member 40 including at least: a seal wall 42Y swelled and curved toward the inner side of the hollow seal member 40; and a protrusion 43 which protrudes toward the outer-cabin side in succession to the seal wall 42Y and makes elastic contact with the protrudingly curved surface 70a of the door 70 together with the seal wall 42Y performs effects of preventing generation of the triangular aperture 110 between the lip 43 and the protrudingly curved surface 70a of the door 70 and dealing with unevenness in fitting to some extent. The hollow seal member 40 becomes more effective when the curvature radius 120 of the seal wall 42Y is larger than the curvature radius 130 of the protrudingly curved surface 70a.

Figure 4:
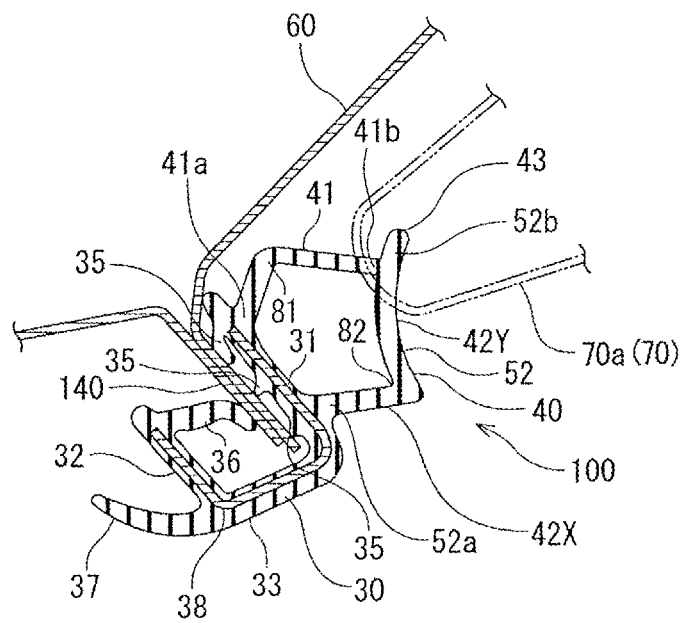
FIG. 4 is a I-I line enlarged cross section of FIG. 5, showing a weather strip according to still another embodiment of the present invention.

Accordingly, as shown in FIG. 4, one end 52a of the second hollow wall 52 having the substantially V-shape in cross-section, which is connected with the first hollow wall 41 having a substantially reversed V-shape in cross-section for forming the hollow seal member 40 may be connected directly to the bottom wall 33 side of the outer-cabin side wall 31 of the installation base member 30. The resultant hollow part is substantially pentagonal. In the resultant hollow seal member 40, the other end 52b side of the second hollow wall 52 compared with the second bent point 82 of the second hollow wall 52 is the seal wall 42Y and the lip 43 which protrudes toward the outer-cabin side over the hollow seal member 40 is provided on the other end 52b of the seal wall 42Y in succession to the seal wall 42Y.

The protrusion of the above-mentioned lip 43 may be a projection of which protruding amount is little and which does not flex or bend.

We claim:

1. A weather strip mounted along a circumferential edge of a door opening of an automobile body, the weather strip comprising: an installation base member having a substantially U-shape in cross-section, including an outer-cabin side wall, an inner-cabin side wall and a bottom wall which connects the side walls; and a hollow seal member provided on an outer-cabin side of the installation base member, said hollow seal member making elastic contact with a protrudingly curved surface having a substantially U-shape in cross-section, which is protrudingly provided toward an inner-cabin side from said door; wherein:

said hollow seal member includes a first hollow wall and a second hollow wall which are connected with each other, said first hollow wall being bent into a substantially reversed V-shape in cross-section around a first bent point and said second hollow wall being bent into a substantially V-shape in cross-section around a second bent point;

one end of said first hollow wall is connected around an end part of the outer-cabin side wall of said installation base member and one end of said second hollow wall is connected to a part determined by protruding toward an outer-cabin side from a part on the bottom wall side of the outer-cabin side wall of said installation base member, descending substantially in parallel with the outer-cabin side wall and further protruding toward said bottom wall side;

an interval between one end of said second hollow wall and the second bent point is a vertical wall vertically formed toward the outer-cabin side and an interval between said second bent point and another end of the second hollow wall is a seal wall swelled and curved toward an inner side of said hollow seal member, said seal wall making elastic contact with the protrudingly curved surface of said door;

the other end of said second hollow wall has a protrusion provided in succession to said seal wall, said protrusion making elastic contact with the protrudingly curved surface of said door together with the seal wall; and another end of said first hollow wall is connected with the inner side of said hollow seal member, which is on the other end of said second hollow wall while said protrusion protrudes toward the outer-cabin side.

2. The weather strip as claimed in claim 1, wherein: curvature radius of the seal wall of said second hollow wall is larger than curvature radius of the protrudingly curved surface protrudingly provided from said door.

3. The weather strip as claimed in claim 2, wherein: a part of the interval between the one end of said second hollow wall and the second bent point is made of material which increases rigidity compared with at least one other part of the second hollow wall or is made to be thicker compared with at least one other part of the second hollow wall for increasing rigidity.

4. The weather strip as claimed in claim 2, wherein: an interval between the second bent point of said second hollow wall and the other end of said second hollow wall is formed at an obtuse angle relative to said vertical wall.

5. The weather strip as claimed in claim 4, wherein: a part of an interval between the one end of said first hollow wall and said first bent point is made of material which increases rigidity compared with at least one other part of the first hollow wall or is made to be thicker compared with at least one other part of the first hollow wall for increasing rigidity.

6. The weather strip as claimed in claim 5, wherein: a part of the interval between the one end of said second hollow wall and the second bent point is made of material which increases rigidity compared with at least one other part of the second hollow wall or is made to be thicker compared with at least one other part of the second hollow wall for increasing rigidity.

7. The weather strip as claimed in claim 4, wherein: a part of the interval between the one end of said second hollow wall and the second bent point is made of material which increases rigidity compared with at least one other part of the second hollow wall or is made to be thicker compared with at least one other part of the second hollow wall for increasing rigidity.

8. The weather strip as claimed in claim 2, wherein: a part of an interval between the one end of said first hollow wall and said first bent point is made of material which increases rigidity compared with at least one other part of the first hollow wall or is made to be thicker compared with at least one other part of the first hollow wall for increasing rigidity.

9. The weather strip as claimed in claim 8, wherein: a part of the interval between the one end of said second hollow wall and the second bent point is made of material which increases rigidity compared with at least one other part of the second hollow wall or is made to be thicker compared with at least one other part of the second hollow wall for increasing rigidity.

10. The weather strip as claimed in claim 1, wherein: an interval between the second bent point of said second hollow wall and the other end of said second hollow wall is formed at an obtuse angle relative to said vertical wall.

11. The weather strip as claimed in claim 10, wherein: a part of an interval between the one end of said first hollow wall and said first bent point is made of material which increases rigidity compared with at least one other part of the first hollow wall or is made to be thicker compared with at least one other part of the first hollow wall for increasing rigidity.

12. The weather strip as claimed in claim 11, wherein: a part of the interval between the one end of said second hollow wall and the second bent point is made of material which increases rigidity compared with at least one other part of the second hollow wall or is made to be thicker compared with at least one other part of the second hollow wall for increasing rigidity.

13. The weather strip as claimed in claim 10, wherein: a part of the interval between the one end of said second hollow wall and the second bent point is made of material which increases rigidity compared with at least one other part of the second hollow wall or is made to be thicker compared with at least one other part of the second hollow wall for increasing rigidity.

14. The weather strip as claimed in claim 1, wherein: a part of an interval between the one end of said first hollow wall and said first bent point is made of material which increases rigidity compared with at least one other part of the first hollow wall or is made to be thicker compared with at least one other part of the first hollow wall for increasing rigidity.

15. The weather strip as claimed in claim 14, wherein: a part of the interval between the one end of said second hollow wall and the second bent point is made of material which increases rigidity compared with at least one other part of the second hollow wall or is made to be thicker compared with at least one other part of the second hollow wall for increasing rigidity.

16. The weather strip as claimed in claim 1, wherein: a part of the interval between the one end of said second hollow wall and the second bent point is made of material which increases rigidity compared with at least one other part of the second hollow wall or is made to be thicker compared with at least one other part of the second hollow wall for increasing rigidity.

* * * * *